(12) United States Patent
Kyung et al.

(10) Patent No.: US 12,175,519 B2
(45) Date of Patent: *Dec. 24, 2024

(54) METHOD, ELECTRONIC DEVICE, AND NON-TRANSITORY COMPUTER-READABLE RECORDING MEDIUM FOR PROVIDING INFORMATION ON ITEM

(71) Applicant: Coupang Corp., Seoul (KR)

(72) Inventors: Su Jin Kyung, Seoul (KR); Seung Mi Han, Seoul (KR)

(73) Assignee: Coupang Corp. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,923

(22) Filed: May 19, 2022

(65) Prior Publication Data

US 2022/0277379 A1    Sep. 1, 2022

Related U.S. Application Data

(63) Continuation of application No. 17/192,660, filed on Mar. 4, 2021, now Pat. No. 11,403,693.

(30) Foreign Application Priority Data

Feb. 19, 2021    (KR) .......................... 10-2021-0022542

(51) Int. Cl.
*G06Q 30/00*    (2023.01)
*G06F 16/28*    (2019.01)
(Continued)

(52) U.S. Cl.
CPC ....... *G06Q 30/0631* (2013.01); *G06F 16/285* (2019.01); *G06F 16/9538* (2019.01);
(Continued)

(58) Field of Classification Search
None
See application file for complete search history.

(56) References Cited

U.S. PATENT DOCUMENTS 10,891,676 B1 * 1/2021 Kan .................. G06Q 30/0629
2006/0167757 A1   7/2006 Holden et al.
(Continued)

FOREIGN PATENT DOCUMENTS

CN    103761669 A    4/2014
CN    109683711 A    4/2019
(Continued)

OTHER PUBLICATIONS

Katukuri, Jayasimha, Recommending similar items in large-scale online marketplaces, Oct. 1, 2014, 2014 IEEE International Conference on Big Data, pp. 868-876 (Year: 2014).*

(Continued)

*Primary Examiner* — Allison G Wood
*Assistant Examiner* — Timothy J Kang
(74) *Attorney, Agent, or Firm* — Knobbe, Martens, Olson & Bear, LLP

(57) ABSTRACT

A method of providing information on or regarding a product in an electronic device according to various example embodiments of the present disclosure may include identifying detailed information on a first product in response to a request on a first page for the first product, identifying, when the first product is included in a specific category, at least one second product corresponding to the specific category, identifying at least one attribute list corresponding to the specific category, and, providing the first page, wherein the first page includes detailed information on the first product displayed in a first portion, first attribute information of the first product corresponding to the attribute list and displayed in a second portion, and second (Continued)

attribute information of the at least one second product corresponding to the attribute list and displayed in a third portion corresponding to the second portion.

12 Claims, 21 Drawing Sheets

(51) Int. Cl.
*G06F 16/9538* (2019.01)
*G06Q 30/0601* (2023.01)
*G06F 3/0483* (2013.01)
*G06F 3/0485* (2022.01)

(52) U.S. Cl.
CPC ....... *G06Q 30/0641* (2013.01); *G06F 3/0483* (2013.01); *G06F 3/0485* (2013.01)

(56) References Cited

U.S. PATENT DOCUMENTS

| | | | |
|---|---|---|---|
| 2006/0212287 A1 | 9/2006 | Bigalet | |
| 2008/0122796 A1 | 5/2008 | Jobs et al. | |
| 2010/0250336 A1* | 9/2010 | Selinger | G06Q 30/0643 |
| | | | 705/26.7 |
| 2012/0151511 A1* | 6/2012 | Bernard | H04N 21/4826 |
| | | | 725/10 |
| 2016/0170576 A1* | 6/2016 | Brown | G06F 3/0485 |
| | | | 715/784 |
| 2017/0262144 A1 | 9/2017 | Shah et al. | |
| 2018/0150879 A1* | 5/2018 | Vasile | G06Q 30/0241 |
| 2018/0165712 A1 | 6/2018 | Sun | |
| 2018/0276462 A1 | 9/2018 | Davis et al. | |

FOREIGN PATENT DOCUMENTS

| | | |
|---|---|---|
| CN | 111833143 A | 10/2020 |
| CN | 107169806 | 11/2020 |
| JP | 2008-529137 A | 7/2008 |
| JP | 2020-511726 A | 4/2020 |
| KR | 10-2000-0036359 A | 7/2000 |
| KR | 10-2000-0054054 A | 9/2000 |
| KR | 10-0486419 B1 | 4/2005 |
| KR | 10-1859055 B1 | 6/2018 |
| KR | 10-2018-0108019 A | 10/2018 |
| KR | 10-2018-0118398 A | 10/2018 |
| KR | 10-2020-0132193 A | 11/2020 |

OTHER PUBLICATIONS

Katukuri, Jayasimha, Recommending similar items in large-scale online marketplaces, Oct. 1, 2014, IEEE International Conference on Big Data, pp. 868-876 (YEAR: 2014).

Examination notice for HK Appl. No. 22021031967.3, issued Oct. 10, 2023.

* cited by examiner

FIG. 11D

METHOD, ELECTRONIC DEVICE, AND NON-TRANSITORY COMPUTER-READABLE RECORDING MEDIUM FOR PROVIDING INFORMATION ON ITEM

CROSS-REFERENCE TO RELATED APPLICATIONS

This application is a continuation of U.S. patent application Ser. No. 17/192,660, filed on Mar. 4, 2021, which claims priority to Korean Application No. 10-2021-0022542, filed Feb. 19, 2021, each of which is incorporated herein by reference in its entirety.

BACKGROUND

Technical Field

Example embodiments of the present disclosure relate to a method and electronic device for providing information on or regarding a plurality of products.

Description of the Related Art

A result of a keyword search for purchasing a product provides information on the searched product. Various platforms where product sales are conducted provide information on products compared to a product to be purchased by a consumer.

If information is provided so that consumers can compare products with similar specifications to products they want to purchase, consumers can broaden their product selection and sellers can increase sales opportunities for the products they are selling.

As a prior document for providing comparison information of products, there is Korean Patent Registration Publication No. 10-1859055.

As such, there is a desire for a method of effectively providing information for purchasing products.

SUMMARY

Technical Goals

If information on only a product to be purchased is provided to a consumer who makes a purchase, opportunities to purchase similar products may be missed, which may lead to unreasonable consumption.

If information on only a product corresponding to a keyword searched by a consumer on a product sales platform is provided to a seller who sells products, a frequency with which the seller's product is exposed to the consumer may be reduced.

To solve the above issues, the present disclosure is to provide information on a comparable product to a seller and customer in addition to information on a product to be sold by the seller and purchased by the customer.

Technical Solutions

According to an aspect, there is provided a method of providing information on a product in an electronic device, the method including identifying detailed information on a first product in response to a request on a first page for the first product, identifying, when the first product is included in a specific category, at least one second product corresponding to the specific category, identifying at least one attribute list corresponding to the specific category, and providing the first page, wherein the first page includes detailed information on the first product displayed in a first portion, first attribute information of the first product corresponding to the attribute list and displayed in a second portion, and second attribute information of the at least one second product corresponding to the attribute list and displayed in a third portion corresponding to the second portion.

According to another aspect, there is also provided an electronic device for providing information on a plurality of products, the electronic device including a processor, wherein the processor is configured to identify detailed information on a first product in response to a request on a first page for the first product, identify, when the first product is included in a specific category, at least one second product corresponding to the specific category, identify at least one attribute list corresponding to the specific category, and provide the first page. The first page includes detailed information on the first product displayed in a first portion, first attribute information of the first product corresponding to the attribute list and displayed in a second portion, and second attribute information of the at least one second product corresponding to the attribute list and displayed in a third portion corresponding to the second portion.

According to another aspect, there is also provided a non-transitory computer-readable recording medium including a medium configured to store computer-readable instructions, wherein the computer-readable instructions are executed by a processor to perform a method of providing information, the method including identifying detailed information on a first product in response to a request on a first page for the first product, identifying, when the first product is included in a specific category, at least one second product corresponding to the specific category, identifying at least one attribute list corresponding to the specific category, and providing the first page. The first page includes detailed information on the first product displayed in a first portion, first attribute information of the first product corresponding to the attribute list and displayed in a second portion, and second attribute information of the at least one second product corresponding to the attribute list and displayed in a third portion corresponding to the second portion.

Effects

According to example embodiments, in an information providing method, by providing information on or regarding a product to be purchased by a consumer and information on products similar to the product to be purchased, it is possible to provide a purchase opportunity with high satisfaction.

According to example embodiments, it is possible to provide an electronic device that provides comparison information on various products to a consumer and provides a seller with information on products for sale along with relevant products, thereby increasing an efficiency of selling and purchasing a product.

BRIEF DESCRIPTION OF THE DRAWINGS

FIGS. 11A through 11D are exemplary diagrams related to fixedly displaying an area in response to a selection input in an information providing method according to example embodiments of the present disclosure.

DETAILED DESCRIPTION

Figure 1:
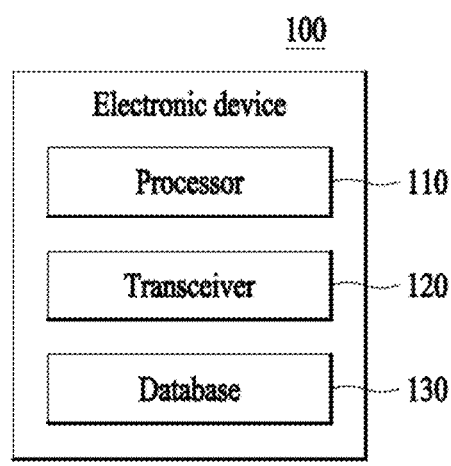
FIG. 1 is a block diagram illustrating internal component of an electronic device according to example embodiments of the present disclosure.

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise specified, "including" any component means that other components may be further included rather than excluding other components. In addition, the terms "unit," "module," and the like, described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook, a desktop, a laptop, and the like, which are equipped with a web browser, and portable terminals are wireless communication devices that ensure portability and mobility, and may include, for example, International Mobile Telecommunications (IMT), code division multiple access (CDMA), W-code division multiple access (W-CDMA), and Long Term Evolution (LTE) terminals, and all kinds of handheld-based wireless communication devices, such as a smartphone and a tablet PC.

In the following description, example embodiments of the present disclosure will be described in detail with reference to the drawings so that those skilled in the art can easily carry out the present disclosure. The present disclosure may be embodied in many different forms and is not limited to the example embodiments described herein.

Hereinafter, example embodiments of the present disclosure will be described with reference to the drawings.

In describing the example embodiments, description of technical content that is well known in the technical field to which the present disclosure pertains and is not directly related to the present disclosure will be omitted. This is to more clearly convey the gist of the present disclosure without ambiguity by omitting unnecessary explanations.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods of accomplishing them will become apparent from example embodiments to be described in detail below with reference to the accompanying drawings. However, the present disclosure is not limited to the example embodiments to be described below, but may be implemented in various different forms, these example embodiments will be provided only in order to make the present disclosure complete and allow those skilled in the art to completely recognize the scope of the present disclosure, and the present disclosure will be defined by the scope of the claims. Throughout the specification, like reference numerals denote like components.

In this case, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including instruction means performing the functions described in the block(s) of the flowchart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses, may also provide operations for performing the functions described in the block(s) of the flowchart.

In addition, each block may indicate some modules, segments, or codes including one or more executable instructions for executing a specific logical function(s). Further, it is to be noted that functions mentioned in the blocks occur regardless of a sequence in some alternative example embodiments. For example, two blocks that are shown consecutively can in fact be simultaneously performed or can be performed in a reverse sequence depending on corresponding functions.

FIG. 1 is a block diagram illustrating internal components of an electronic device according to various example embodiments.

Referring to FIG. 1, internal components of an electronic device 100 are not limited to the illustrated components. The electronic device 100 may include at least one of a processor 110, a transceiver 120, and a database 130.

The processor 110 may process a series of operations for performing a method of sharing item information according to example embodiments of the present disclosure. The processor 110 may control other components of the electronic device 100. In the example embodiments, the term "product" may be used as a term referring to a specific item. An item may be sold to a user in a service related to the electronic device 100.

The processor 110 may identify detailed information on or regarding a first product in response to a request on a first page for the first product. When it is verified through the database 130 that the first product is included in a specific category, the processor 110 may identify at least one second product corresponding to the specific category. The processor 110 may identify at least one attribute list corresponding to the specific category. The attribute list may be stored in the database 130 in advance or received from an external source through the transceiver 120. The processor 110 may provide the first page to a display of the electronic device 100. The first page may include a first portion in which the detailed information on the first product is provided, a second portion in which first attribute information of the first product corresponding to the attribute list is provided, and a third portion in which second attribute information of at least one second product corresponding to the attribute list is provided.

The transceiver 120 may perform a function of transmitting information stored in the database 130 of the electronic device 100 or information processed by the processor 110 to another device, or receiving information from another device to the electronic device 100.

The database 130 is a data structure implemented in a predetermined storage space of the electronic device 100, and functions such as storing, searching, deleting, editing, or adding data may be freely performed. For example, the database 130 may include fields or elements for processing functions such as storing, searching, deleting, editing, or adding data. The database 130 may store data related to the electronic device 100 performing an information providing method. For example, the database 130 may store instructions or data for an execution operation of the processor 110.

Figure 2:
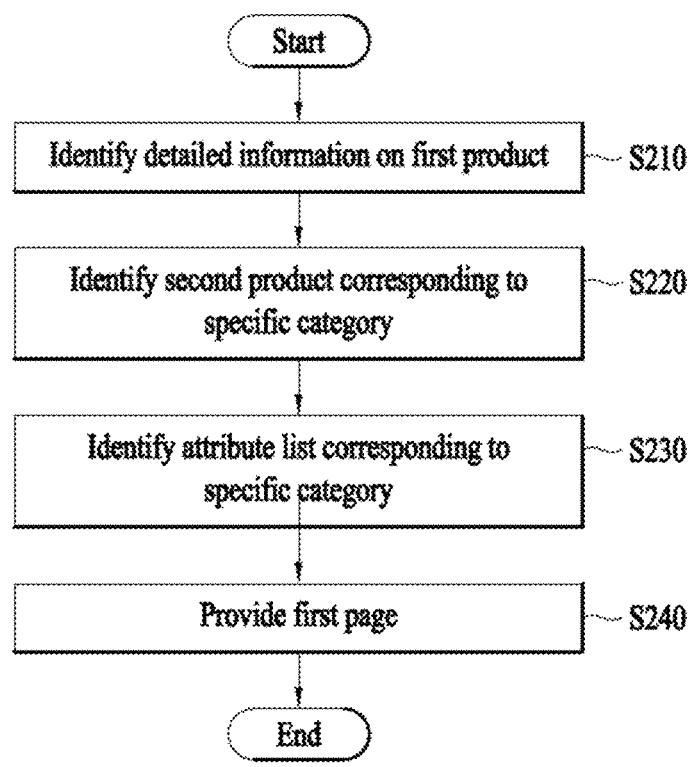
FIG. 2 is a flowchart illustrating a method of providing information according to example embodiments of the present disclosure.

FIG. 2 is a flowchart illustrating a method of providing information according to example embodiments.

FIG. 2 shows a flowchart of identifying detailed information on a first product, identifying a second product corresponding to a specific category for the identified first product, identifying an attribute list corresponding to the specific category, and providing a first page including identified information.

In operation S210, detailed information on a first product may be identified. The detailed information on the first product may include, for example, product name information of the first product, information associated with product specifications, information associated with an example of use of the product, information associated with precautions when using the product, or the like.

In operation S220, when the first product is included in a specific category, at least one second product corresponding to the specific category may be identified. For example, when the first product is a laptop computer, the first product may be included in the specific category. The specific category may include a category of various products. For example, the specific category may include categories related to various products such as a laptop computer, a desktop computer, a mobile phone, a tablet PC, a wearable device, a TV, a refrigerator, or the like. In operation S220, when the first product is the laptop computer, a second product corresponding to the laptop computer which is the specific category may be identified. The first product and the second product may be products included in the same category.

In operation S230, at least one attribute list corresponding to the specific category may be identified. For example, when the first product is the laptop computer, an attribute list corresponding to the laptop computer which is the specific category may be identified. Here, the attribute list corresponding to the specific category may include a list related to an attribute corresponding to information associated with specifications of the first product among the detailed information on the first product identified in operation S210. When the specific category is the laptop computer, the attribute list corresponding to the laptop computer may include, for example, price information, rating information, manufacturer information, release timing information, display size information, or CPU performance information.

In operation S240, the first page including the information identified in operations S210 through S230 may be provided. For example, the first page may be provided by displaying the detailed information on the first product in a first portion, displaying first attribute information of the first product corresponding to the attribute list in a second portion, and displaying second attribute information of at least one second product corresponding to the attribute list in a third portion.

Figure 3:
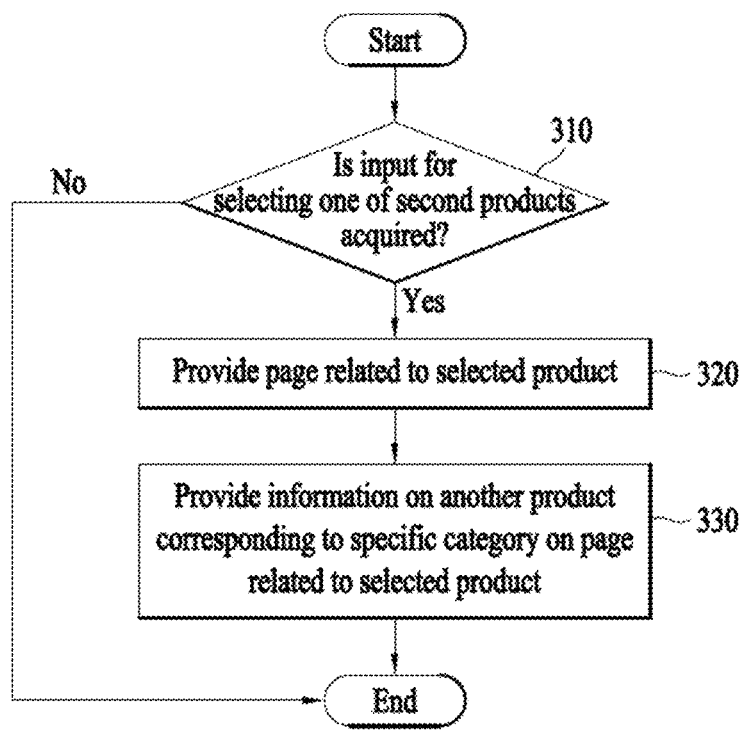
FIG. 3 is a flowchart of providing a page for a second product corresponding to a specific category according to example embodiments of the present disclosure.

FIG. 3 is a flowchart of providing a page related to a second product corresponding to a specific category according to example embodiments of the present disclosure.

Referring to FIG. 3, when an input for selecting one of a plurality of second products for which information is provided by comparison with a first product is acquired, a page (e.g., a page different from a first page) related to the product selected from the second products may be provided, and detailed information on the second product, second attribute information of the second product, and attribute information (e.g., first attribute information) of other products (e.g., the first product) to be compared to the second product may be provided on the page related to the selected product.

In operation 310, whether an input for selecting one of a plurality of second products is acquired may be verified. For example, the plurality of second products may include a product of which attribute information is compared to that of the first product on the first page related to the first product. When a user applies an input for selecting one of the plurality of second products provided on the first page, it is verified in operation 310 that a selection input for one of the second products is acquired, so that operation 320 is performed.

In operation 320, a page related to the product selected from the second products may be provided. For example, the page related to the selected product may contain and provide similar information to the first page related to the first product. The page related to the selected product may include detailed information on the products selected from the second products, attribute information according to an attribute list of the selected product, and attribute information of other products to be compared to the selected product. The attribute list of the selected product may be substantially the same as the attribute list of the first product on the first page although there may be a slight difference.

In operation 330, information on another product corresponding to a specific category may be provided on the page related to the selected product. For example, the specific category on the page related to the selected product may be the same as the specific category of the first product on the first page. This may be because the information on the second product is provided by confirming the correspondence of the specific category of the first product provided on the first page. For example, the attribute list of the selected product may be partially the same as the attribute list of the first product on the first page although there may be a slight difference. This may be because the attribute list corresponding to the specific category provided on the first page may be identified based on the first product, the first attribute information included in the attribute list of the first product may fully correspond to the attribute list, and the second attribute information of the second product may not fully correspond to the attribute list of the first product. For example, when the first product is a laptop computer A, an attribute list corresponding to the laptop computer may include price information, rating information, manufacturer information, release timing information, display size information, SSD capacity information, CPU performance information, or the like. Here, since the laptop computer A is equipped with an SSD, attribute information related to the SSD capacity information of the attribute list may exist. In contrast, when the SSD is not installed in a laptop computer B corresponding to the second product, attribute information related to the SSD capacity information may not exist.

Figure 4A:
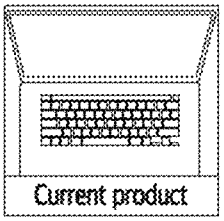
FIGS. 4A and 4B are exemplary diagrams illustrating a method of providing product information according to example embodiments of the present disclosure.
Figure 4B:
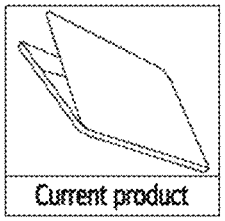

FIGS. 4A and 4B are exemplary diagrams illustrating a method of providing product information according to example embodiments of the present disclosure.

FIG. 4A shows an example of providing, on a first page, detailed information on or regarding a first product, first attribute information of the first product corresponding to an attribute list of a specific category to which the first product may belong, and second attribute information of a second product that may be included in the same category as the first product.

Referring to FIG. 4A, the first product may be a laptop computer A. The laptop computer A is provided by comparing information with that of a second product on a page (e.g., the first page) as shown in FIG. 4A. As such, a product for which attribute information (e.g., first attribute information, second attribute information) between a product (e.g., the first product) used as a reference on the first page and a product (e.g., the second product) corresponding to information to be compared is provided may correspond to a product belonging to a specific category. For example, the specific category may include categories related to various products such as a laptop computer, a desktop computer, a mobile phone, a tablet PC, a wearable device, a TV, a refrigerator, or the like. At least one attribute list corresponding to the specific category may differ based on products included in the specific product. As an example, an attribute list corresponding to a laptop computer may include, for example, price information, rating information, manufacturer information, release timing information, display size information, SSD capacity information, or CPU performance information. As another information, an attribute list corresponding to a refrigerator may include, for example, price information, rating information, manufacturer information, release timing information, capacity information, power consumption information, or power consumption level information.

The detailed information of the first product may be provided and displayed in a first portion 410 of the first page. The detailed information on the first product may include, for example, product name information of the first product, information associated with product specifications, information associated with an example of use of the product, information associated with precautions when using the product, or the like.

The first attribute information of the first product corresponding to the attribute list may be displayed and provided in a second portion 420. Referring to FIG. 4A, for the laptop computer A corresponding to the first product, the first attribute information corresponding to the attribute list related to the laptop computer included in the specific category may be provided in the second portion 420.

The second attribute information of the second product corresponding to the attribute list may be provided and displayed in a third portion 430 corresponding to the second portion 420. For example, the second product may include products such as a laptop computer B, a laptop computer C, a laptop computer D, and the like. Attribute information on individual products among a plurality of second products may be provided to correspond to the attribute list. A reference for identifying the plurality of second products may be one or more. The second product may be selected based on information of products included in the specific category. The information on the products may include at least one of rating information, price information, review information, and preference information. As an example, the second product to be compared to the first product may include a product having price information similar to that of the first product. As another example, the second product to be compared to the first product may be selected based on a product having review information corresponding to reviews of the predetermined number (e.g., 200) of or more among the products included in the specific category. As another example, the second product to be compared to the first product may include a product of which rating information among the attribute list of the specific category is greater than or equal to a predetermined rating (e.g., 4 out of 5).

FIG. 4B shows an example of providing detailed information on a second product that is a product selected in response to an input of selecting one of information of a plurality of second products provided on a first page, second attribute information of a second product corresponding to an attribute list of a specific category to which the second product is to belong, and attribute information of a product that may belong to the same category as the second product.

Referring to FIGS. 4A and 4B, the second product may be a laptop computer D. The laptop computer D may be provided by comparing its information to that of the first product on the page (e.g., the first page) shown in FIG. 4A.

The detailed information of the second product may be provided and displayed in a first portion 440 of a page related to the selected product. The detailed information on the second product may include, for example, product name information of the second product, information associated with product specifications, information associated with an example of use of the product, information associated with precautions when using the product, or the like.

The second attribute information of the second product corresponding to the attribute list may be provided and displayed in a second portion 450. Referring to FIG. 4B, for the laptop computer D corresponding to the second product, the second attribute information corresponding to the attribute list related to the laptop computer included in the specific category may be provided in the second portion 450.

The attribute information of the product corresponding to the attribute list of the specific category may be provided and displayed in a third portion 460 corresponding to the second portion 450. For example, the second product may include the laptop computer A corresponding to the first product for which the information has been provided on the first page. Attribute information on or regarding individual products among a plurality of products may be provided to correspond to the attribute list. A reference for identifying the plurality of products may be one or more. As an example, the product to be compared to the second product may include a product having price information similar to that of the second product. As another example, the product to be compared to the second product may include a product of which at least one attribute information is the same as that of the second product. As another example, the product to be compared to the second product may include a product of which rating information among the attribute list of the specific category is greater than or equal to a predetermined rating (e.g., 4 out of 5).

Figure 5:
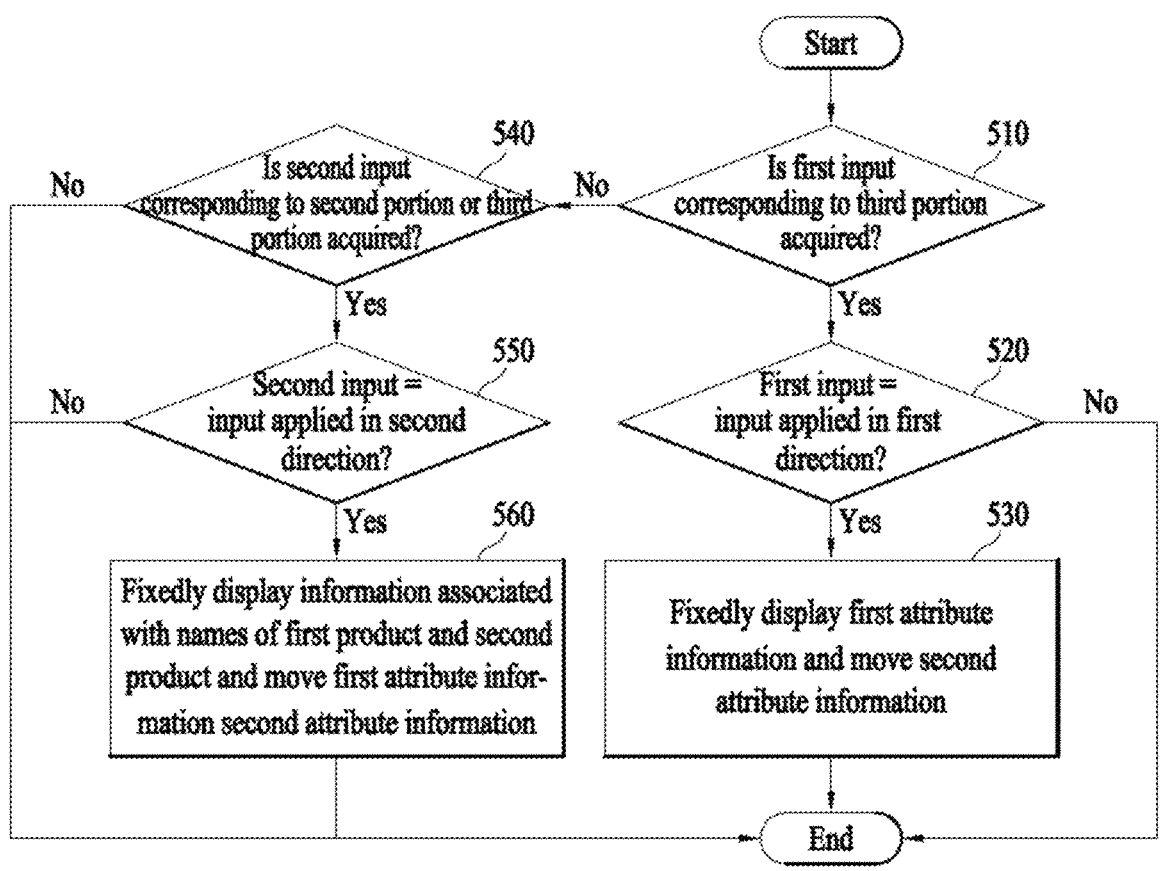
FIG. 5 is a flowchart of displaying information corresponding to an input to a predetermined portion of a page on which information is provided according to example embodiments of the present disclosure.

FIG. 5 is a flowchart related to displaying information corresponding to an input to a predetermined portion of a page on which information is provided according to example embodiments of the present disclosure.

FIG. 5 is a flowchart illustrating a process of moving information provided in response to an input to a predetermined portion of a first page. In the present disclosure, the description is based on a case in which a first input is applied in a first direction and a second input is applied in a second direction.

Operation 510 may verify whether a first input corresponding to a third portion (e.g., the third portion 430 of FIG. 4A, the third portion 460 of FIG. 4B) of a first page is acquired. As an example, when a scroll input is acquired at the third portion, operation 520 may be performed. As another example, when a scroll input is not acquired at the third portion, operation 540 may be performed.

Operation 520 may verify whether the first input is an input applied in the first direction. As an example, the first direction may include a leftward direction from the third portion of the first page. As another example, the first direction may include a rightward direction from the third portion of the first page. As an example, the first input applied in the first direction may include a scroll input for moving at least a portion of the third portion of the first page in the leftward direction. As another example, the first input applied in the first direction may include a scroll input for moving at least a portion of the third portion of the first page in the rightward direction.

Operation 530 may provide information by fixedly displaying first attribute information and movably displaying the second attribute information. For example, the first attribute information of the first product may be fixedly displayed in a second portion (e.g., the second portion 420 of FIG. 4A, the second portion 450 of FIG. 4B). Also, the second attribute information of the second product may be displayed while moving in the first direction by the first input corresponding to the third portion.

Operation 540 may verify whether a second input corresponding to the second portion or the third portion is acquired. Whether the second input corresponding to the third portion or the second portion of the first page is acquired may be verified. As an example, when a scroll input is acquired at the second portion or the third portion, operation 550 may be performed. As another example, when a scroll input is not acquired at the second portion or the third portion, the first page may be continuously provided without changing.

Operation 550 may verify whether the second input is an input applied in the second direction. As an example, the second direction may include an upward direction from the second portion or the third portion of the first page. As another example, the second direction may include a downward direction from the second portion or the third portion of the first page. As an example, the second input applied in the second direction may include a scroll input for moving at least a portion of the second portion or the third portion of the first page in the upward direction. As another example, the second input applied in the second direction may include a scroll input for moving at least a portion of the second portion or the third portion of the first page in the downward direction.

Operation 560 may provide information by fixedly displaying information associated with names of the first product and the second product and movably displaying the first attribute information and the second attribute information. For example, the laptop computer A and the laptop computer B corresponding to the information associated with the names of the first product and the second product may be fixedly displayed in the second portion and the third portion, respectively. Also, the first attribute information of the first product and the second attribute information of the second product may be provided while moving in the second direction by the second input corresponding to the second portion or the third portion.

In the flowchart of FIG. 5, information provided fixedly by the first input of the first direction or the second input of the second direction is not limited to the foregoing example. For example, information fixed by the second input of the second direction may be information other than product name information.

FIGS. 6A through 6D are exemplary diagrams related to displaying information corresponding to an input to a predetermined portion in a page on which information is provided according to example embodiments of the present disclosure.

Figure 6A:
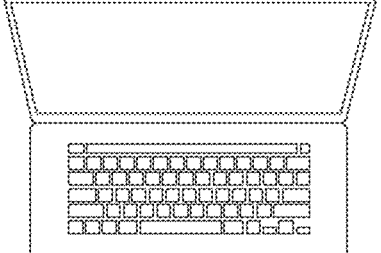
FIGS. 6A through 6D are exemplary diagrams of displaying information corresponding to an input to a predetermined portion of a page on which information is provided according to example embodiments of the present disclosure.
Figure 6B:
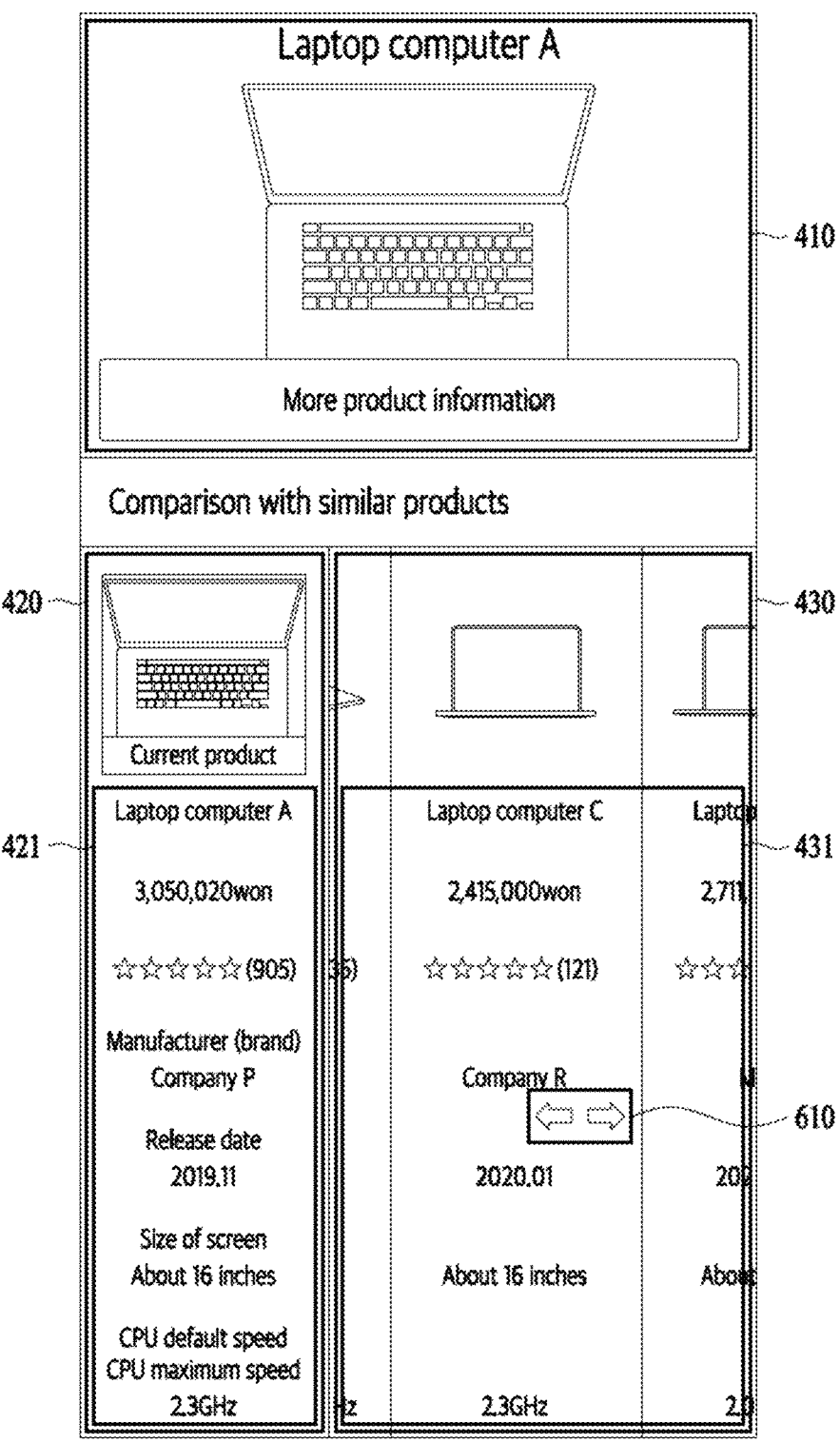
Figure 6C:
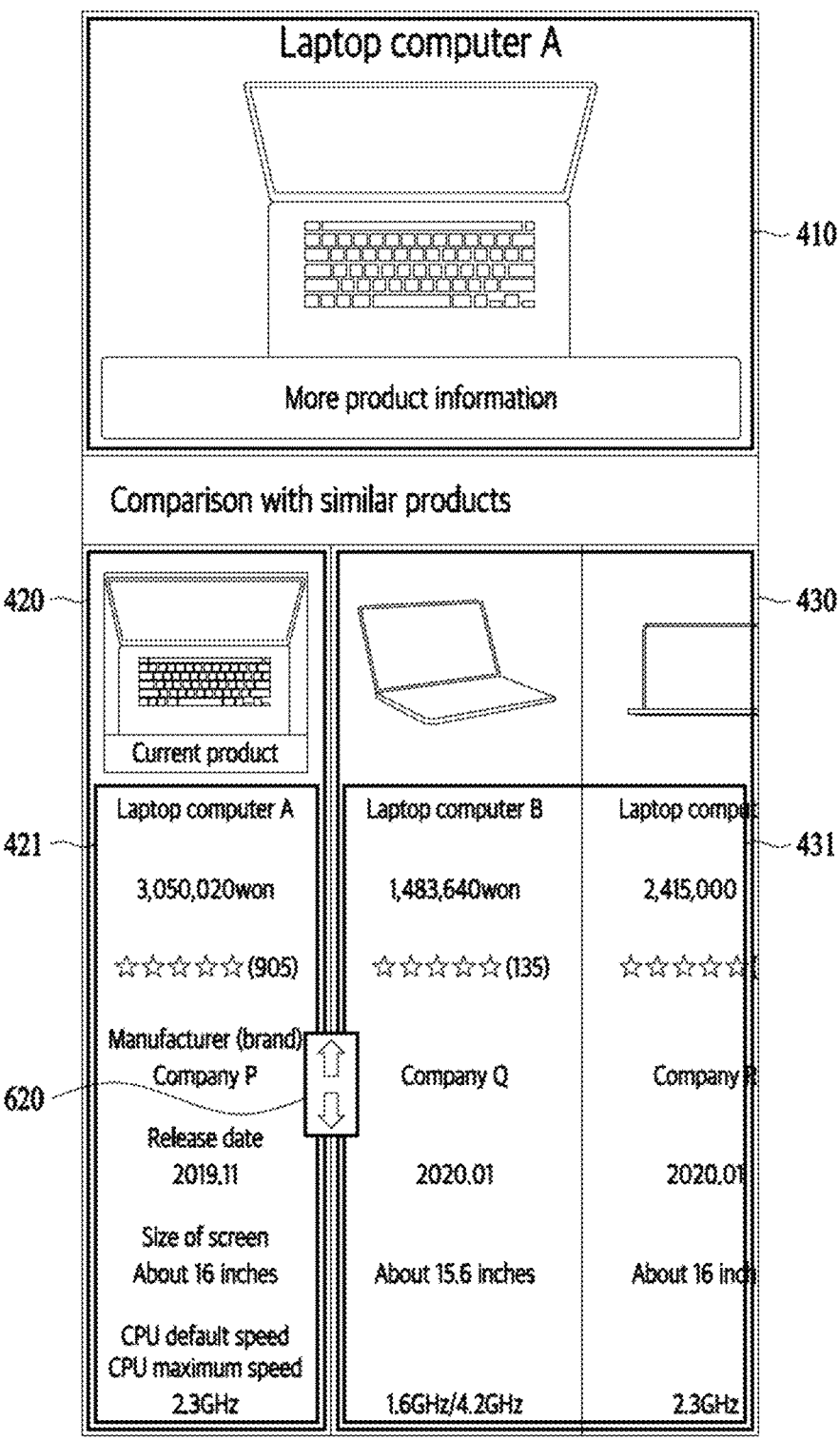
Figure 6D:
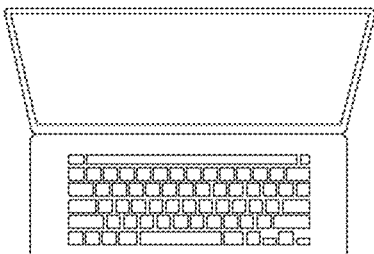

FIGS. 6A through 6D show examples related to the flowchart of FIG. 5. FIGS. 6A and 6B correspond to examples of providing information on a first page according to a first input of a first direction. FIGS. 6C and 6D correspond to examples of providing information on the first page according to a second input of a second direction.

Referring to FIGS. 6A and 6B, a first input 610 of a first direction may include at least one of a scroll input applied through a touchscreen, an input of moving a scroll bar leftward or rightward, and an input for moving information displayed on any display leftward or rightward.

First attribute information 421 of the first product may be displayed in a portion of the second portion 420 and provided. Second attribute information 431 of the second product may be displayed in a portion of the third portion 430 and provided. When the first input 610 of the first direction corresponding to the third portion 430 is acquired, the first attribute information 421 of the first product may be fixedly displayed in the second portion 420. Also, in this case, the second attribute information 431 of the second product may be displayed while moving in the first direction by the first input 610 of the first direction corresponding to the third portion 430. Referring to FIGS. 6A and 6B, the second attribute information 431 of the second product may be provided while moving leftward by the first input 610 of the first direction.

Referring to FIGS. 6C and 6D, a second input 620 of a second direction may include at least one of a scroll input applied through a touchscreen, an input of moving a scroll bar upward or downward, and an input for moving information displayed on any display upward or downward.

The information may be provided by fixedly displaying information (e.g., a laptop computer A, a laptop computer B, a laptop computer C) associated with names of the first product and the second product and movably displaying the first attribute information 421 of the first product and the second attribute information 431 of the second product. For example, the laptop computer A, the laptop computer B, and the laptop computer C corresponding to the information associated with names of the first product and the second product may be fixedly displayed in portions of the second portion 420 and the third portion 430, respectively. Also, the first attribute information 421 of the first product and the second attribute information 431 of the second product may be displayed while moving in the second direction by the second input 620 of the second direction corresponding to the second portion 420 or the third portion 430. Referring to FIGS. 6C and 6D, the first attribute information 421 of the first product and the second attribute information 431 of the second product may be displayed while moving upward by the second input 620 of the second direction.

Figure 7:
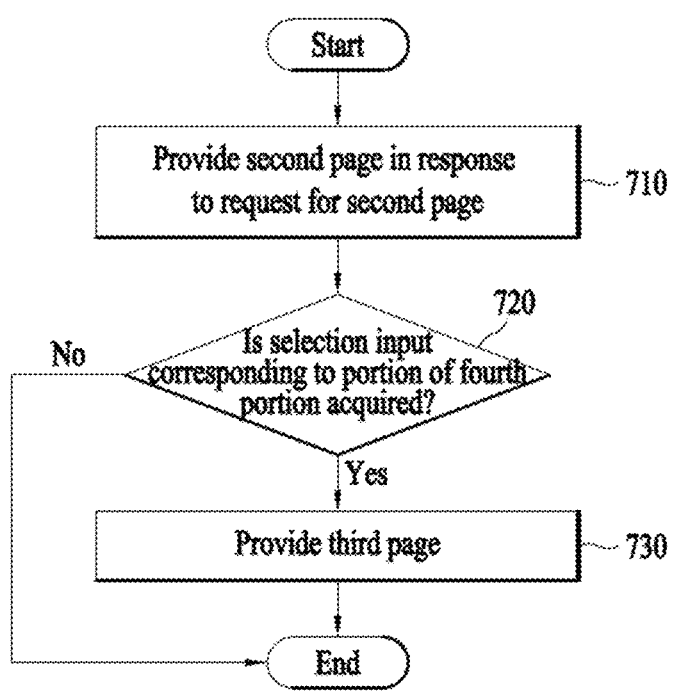
FIG. 7 is a flowchart illustrating an example of providing a new page in response to a selection input to a predetermined portion of a page on which information is provided according to example embodiments of the present disclosure.

FIG. 7 is a flowchart of providing a new page in response to a selection input to a predetermined portion of a page on which information is provided according to example embodiments of the present disclosure.

Referring to FIG. 7, in response to a request for a second page on which a product list including a first product is displayed, the second page may be provided. The second page may include third attribute information of a third product corresponding to an attribute list and displayed in a fourth portion. The third product may include a product different from a second product (e.g., the second product that is compared to the first product on the first page). Here, in the fourth portion, among the third attribute information of the third product, product name information and price information may be briefly provided.

In operation 710, a second page may be provided in response to a request for the second page. For example, the second page may include a page on which a product list including the first product is displayed. The second page may include a product list page provided as a result obtained by inputting a keyword "laptop computer." When the first product is a laptop computer A, in response to the keyword "laptop computer" being input to a keyword input window, a product list including the laptop computer A may be provided on the second page. In addition to information associated with the first product, information associated with the third product may be provided in the fourth portion of the second page. The information associated with the third product may include the third attribute information of the third product.

In operation 720, whether a selection input corresponding to a portion of the fourth portion is acquired may be verified. As an example, when the selection input corresponding to a portion of the fourth portion is acquired, operation 730 may be performed. As another example, when the selection input corresponding to a portion of the fourth portion is not acquired, the second page may be continuously provided without changing.

In operation 730, a third page may be provided. For example, when the selection input corresponding to the portion of the fourth portion is acquired, the third page on which first attribute information of the first product and the third attribute information of the third product are displayed may be provided.

Figure 8A:
FIGS. 8A and 8B are exemplary diagrams of providing a new page in response to a selection input to a predetermined portion of a page on which information is provided according to example embodiments of the present disclosure.
Figure 8B:
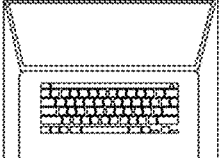

FIGS. 8A and 8B are exemplary diagrams of providing a new page in response to a selection input to a predetermined portion of a page on which information is provided according to example embodiments of the present disclosure.

FIG. 8A is an exemplary diagram illustrating a second page. Referring to FIG. 8A, a fourth portion 810, a portion 811 of the fourth portion, and information associated with another product (e.g., a first product) may be provided on the second page.

FIG. 8B is an exemplary diagram illustrating a third page provided in response to an input corresponding to a portion (e.g., the portion 811 of the fourth portion of FIG. 8A) of the fourth portion in the second page. Referring to FIGS. 8A and 8B, first attribute information of the first product corresponding to an attribute list is provided in a fifth portion 820 of the third page. Also, on the second page, third attribute information of the third product may be provided in a sixth portion 830 corresponding to the fifth portion 820. The example of FIG. 8B in which the information on or regarding the first product (e.g., the laptop computer A) is provided as "just viewed product" may include a case in which information on the first product has been provided on the first page or the second page. Referring to FIG. 8A, in the sixth portion 830, the third attribute information of the third product that has been provided in the fourth portion 810 of the second page may be provided. A reference for the third product provided in the sixth portion 830 may include one or more references. As an example, in terms of price information, the third product that is compared to the first product may include a product corresponding to a higher price than that of the first product. As another example, the third product that is compared to the first product may include a product having at least one same attribute information as that of the first product. As another example, the third product that is compared to the first product may include a product of which rating information among an attribute list of a specific category is greater than or equal to a predetermined rating (e.g., 4 out of 5).

Figure 9:
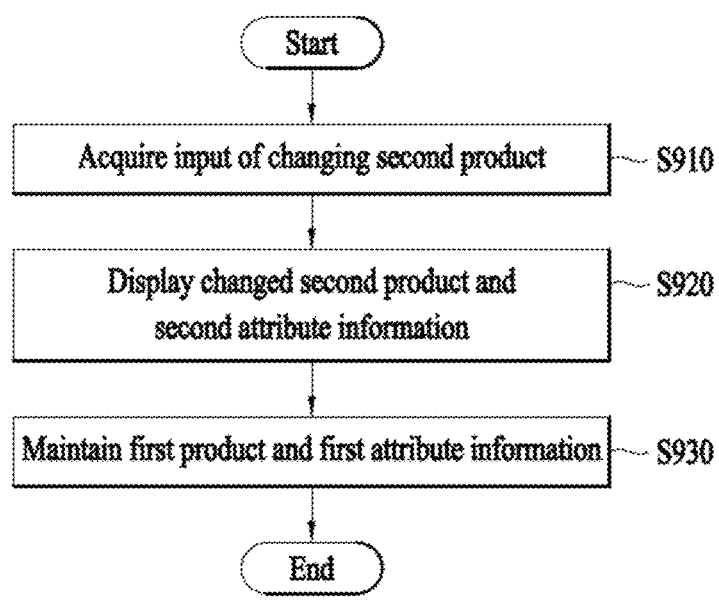
FIG. 9 is a flowchart illustrating an update related to some information in an information providing method according to example embodiments of the present disclosure.

FIG. 9 is a flowchart related to an update of some information in an information providing method according to example embodiments of the present disclosure.

FIG. 9 is a flowchart of displaying, in response to an input of changing a second product being acquired, second attribute information of the second product and the changed second product while providing first attribute information and detailed information of a first product to remain as the same.

In operation S910, an input of changing a second product may be acquired. For example, the input of changing the second product may include an input to a specific button.

The input of changing the second product may include an input similar to a button for refreshing a page of an Internet browser.

In operation S920, a changed second product having at least one difference from the existing second product and second attribute information corresponding to the changed second product may be provided. For example, when the existing second product is a laptop computer B, a laptop computer C, and a laptop computer D, in response to the input of changing the second product being acquired, the existing second product may be changed to the laptop computer C, a laptop computer X, and a laptop computer Y.

In operation S930, irrespective of the acquisition of the input for changing the second product, the first product and the first attribute information of the first product may be maintained and provided. For example, when the first product is the laptop computer A, even if the input for changing the second product is acquired, the first product may remain as being the laptop computer A and be provided.

Figure 10A:
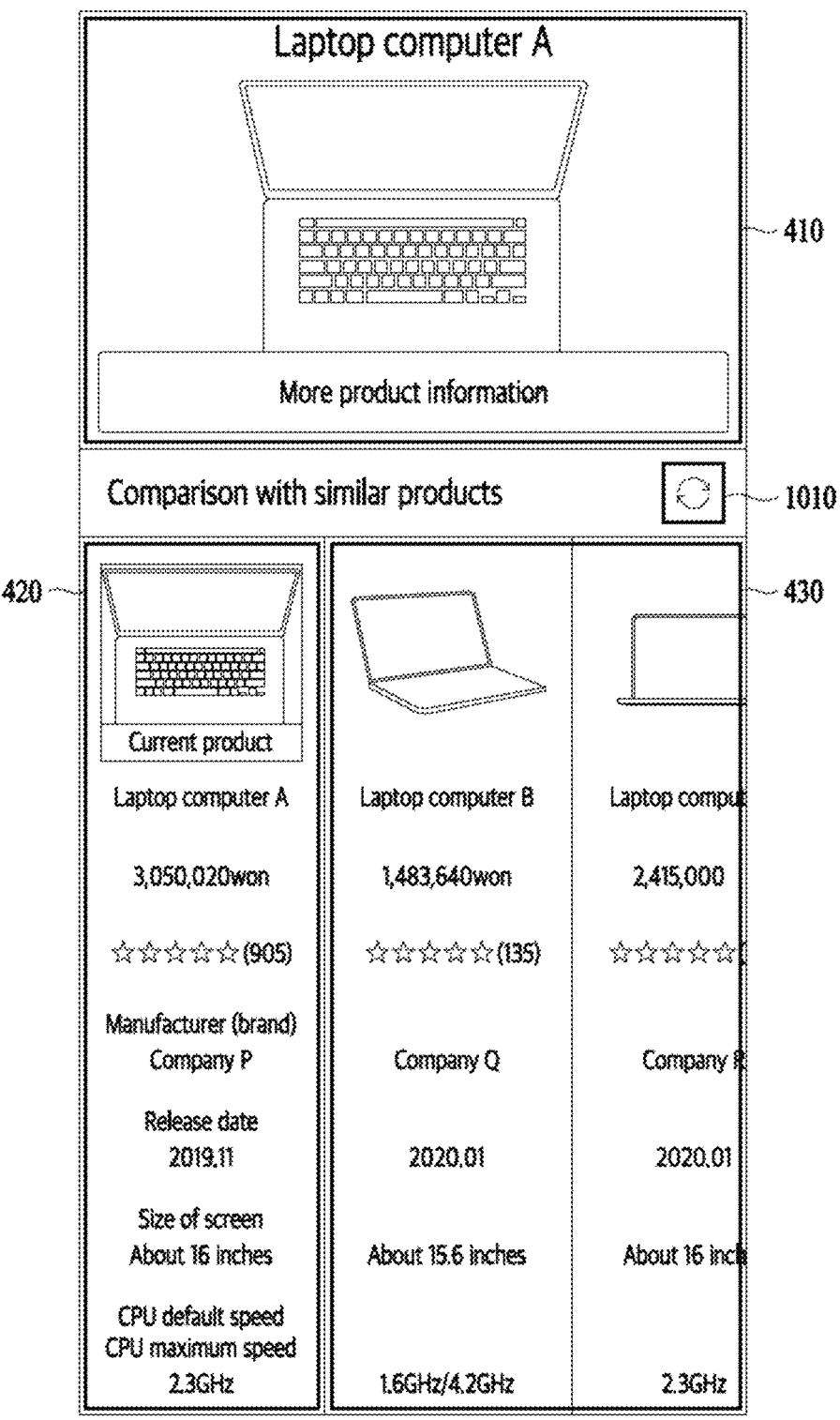
FIGS. 10A and 10B are exemplary diagrams illustrating an update related to some information in an information providing method according to example embodiments of the present disclosure.
Figure 10B:
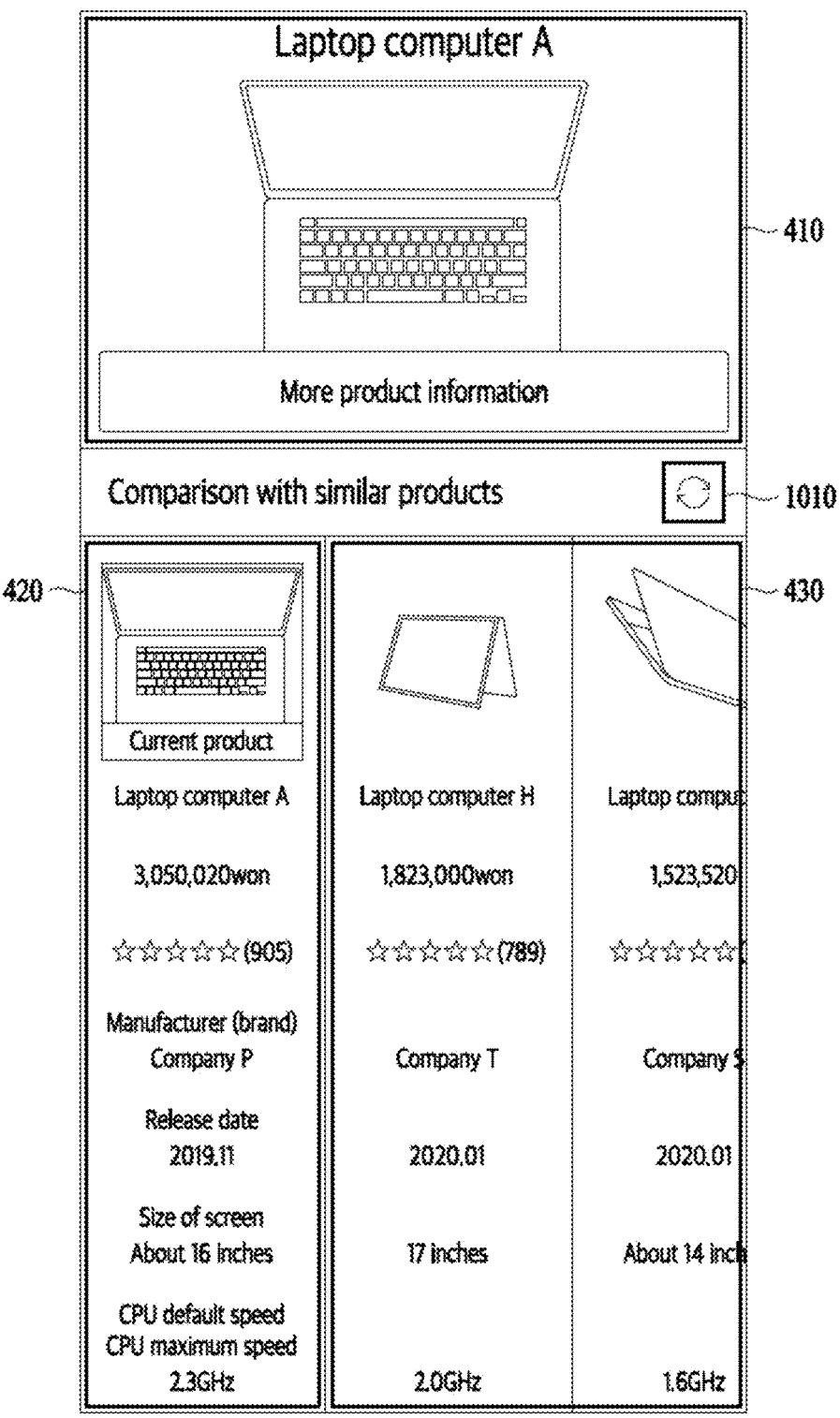

FIGS. 10A and 10B are exemplary diagrams related to an update of some information in an information providing method according to example embodiments of the present disclosure.

FIGS. 10A and 10B are exemplary diagrams corresponding to the flowchart of FIG. 9.

Referring to FIG. 10A, a portion 1010 for an input of changing a second product may be provided on a first page. The portion 1010 for the input of changing the second product may be provided as a portion for an input of changing a third product on a second page or a third page.

Referring to FIGS. 10A and 10B, when an input to the portion 1010 for the input of changing the second product is acquired, a second product and second attribute information of the second product may be changed and provided. For example, in FIG. 10A, information associated with a laptop computer B and a laptop computer C as second products may be provided. When the input to the portion 1010 for the input of changing the second product is acquired, information on a laptop computer H and a laptop computer G as the second products may be provided as shown in FIG. 10B. A reference for the changed second product may include one or more references. As an example, in terms of price information, the changed second product may include a product corresponding to a higher price in comparison to the first product or the second product not changed yet. As another example, the changed second product may include a product having at least one same attribute information as that of the first product or the second product not changed yet. As another example, the changed second product may include a product of which rating information among an attribute list of a specific category is greater than or equal to a predetermined rating (e.g., 4 out of 5).

FIGS. 11A through 11D are exemplary diagrams related to fixedly displaying an area in response to a selection input in an information providing method according to example embodiments of the present disclosure.

Figure 11A:
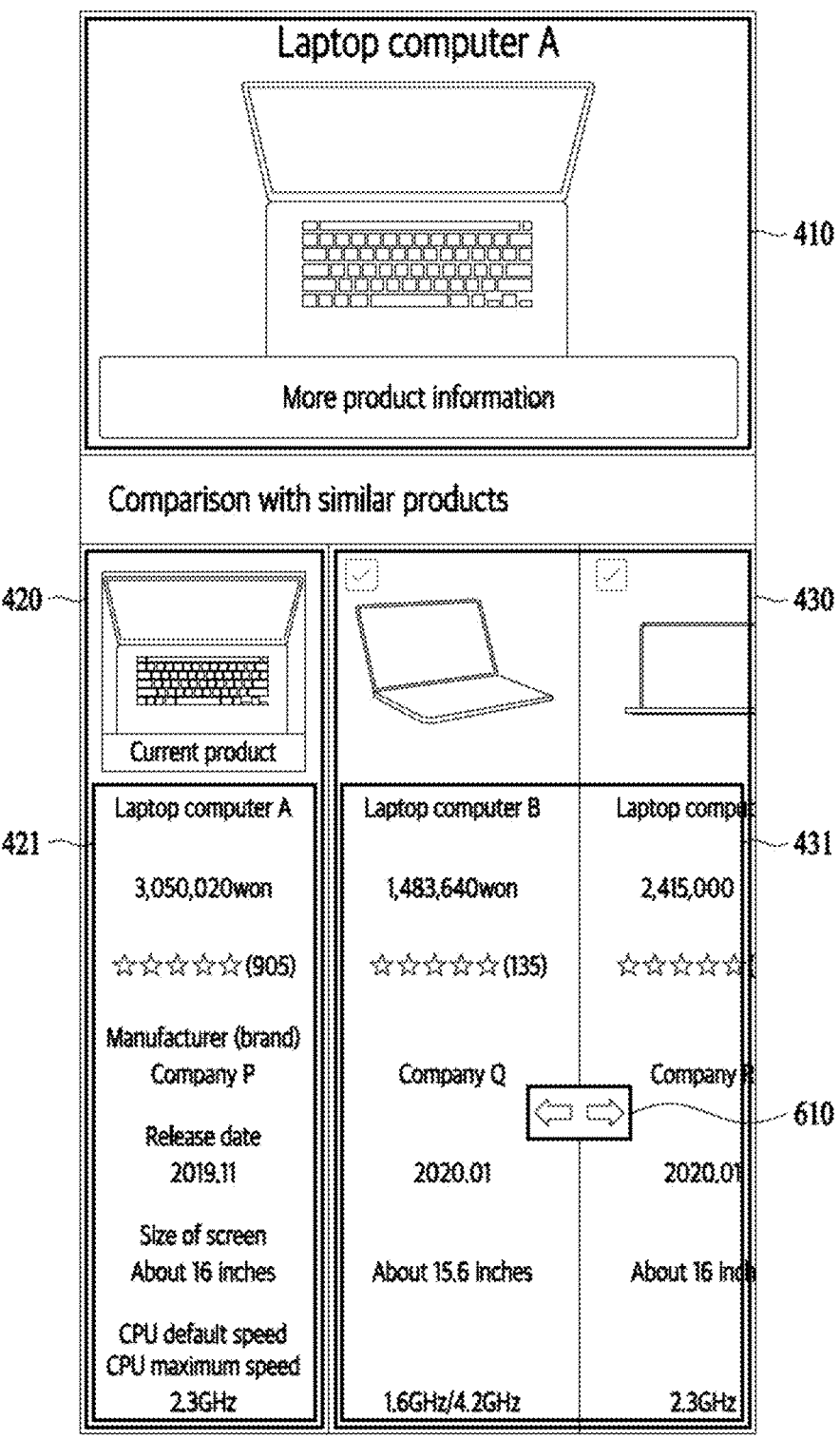
Figure 11B:
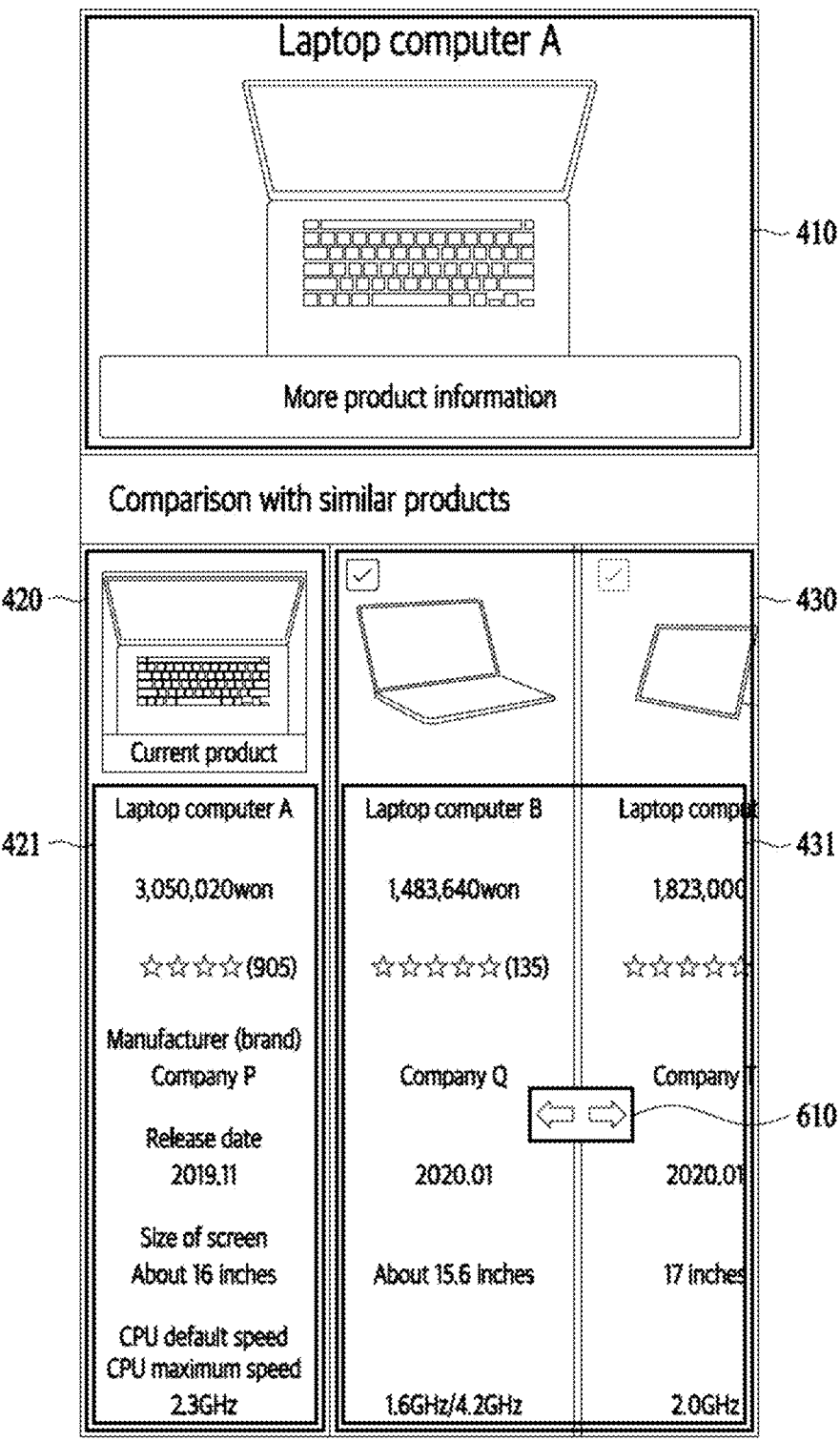
Figure 11C:
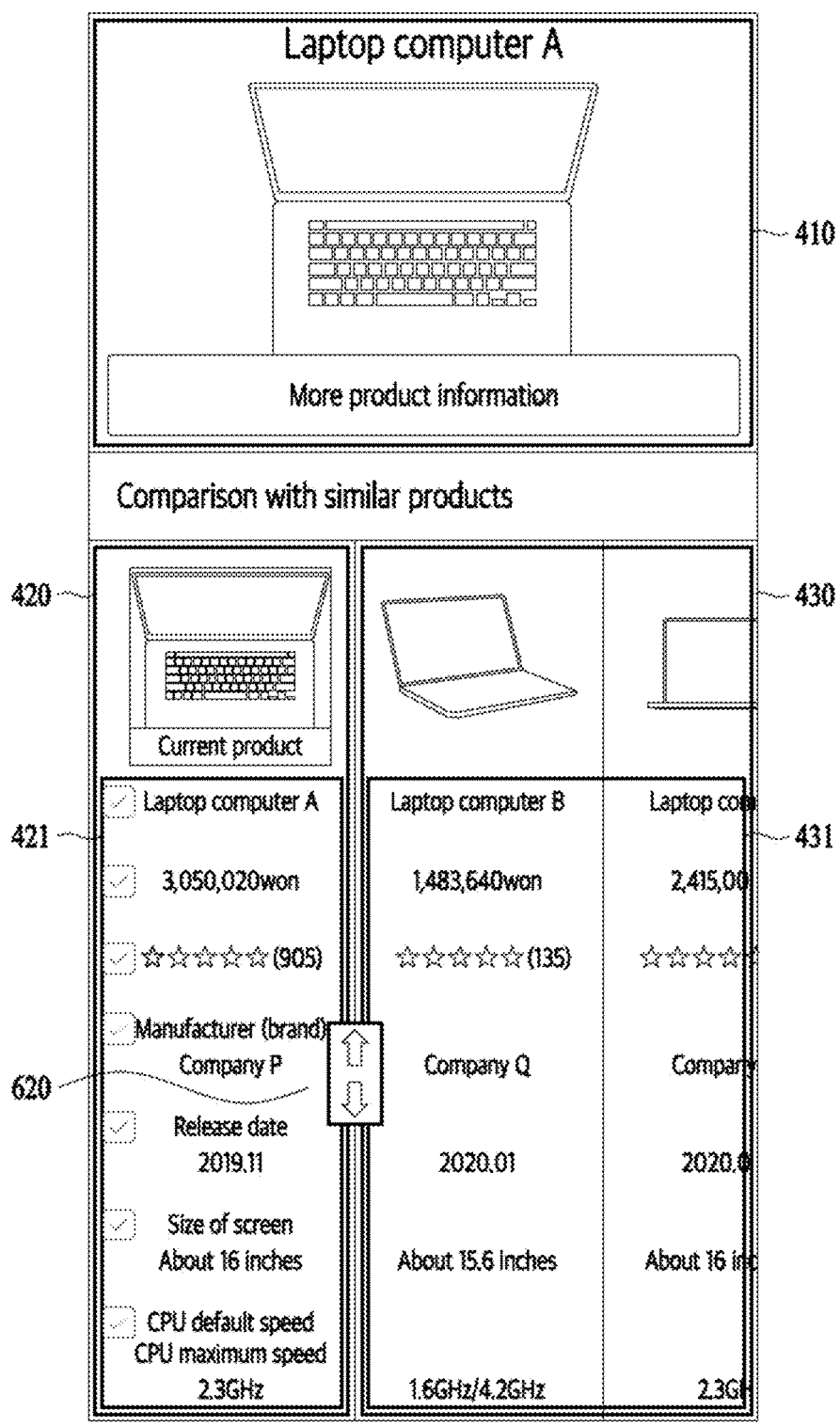
Figure 11D:
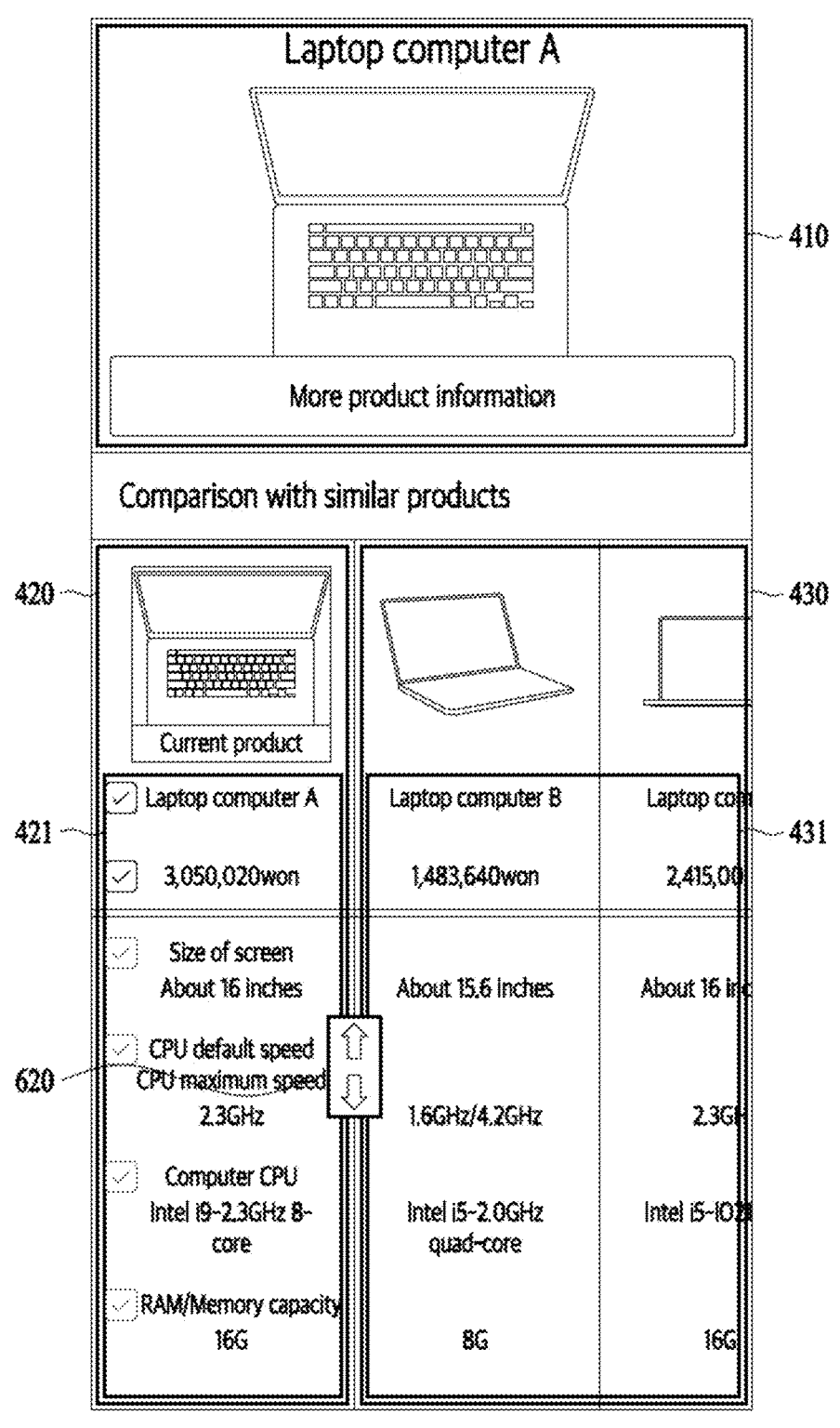

FIGS. 11A through 11D show examples related to the flowchart of FIG. 5. FIGS. 11A and 11B correspond to examples of providing information on a first page according to a first input of a first direction. FIGS. 11C and 11D correspond to examples of providing information on the first page according to a second input of a second direction.

Referring to FIGS. 11A and 11B, the first input 610 of the first direction may include at least one of a scroll input applied through a touchscreen, an input of moving a scroll bar leftward or rightward, and an input for moving information displayed on any display leftward or rightward.

The first attribute information 421 of the first product may be displayed in a portion of the second portion 420 and provided. The second attribute information 431 of the second product may be displayed in a portion of the third portion 430 and provided. Referring to FIG. 11A, the third portion 430 may include a portion allowed to receive an input for providing information with fixing individual products selected from a plurality of second products. The portion in which the individual products selected from the plurality of second products are fixed may include a collective information portion for an individual second product in the third portion 430 of FIG. 11A. For example, all pieces of second attribute information of the laptop computer B corresponding to an individual product among the plurality of second products may be fixed. As an example, when a checkbox at a top of the plurality of second products (e.g., the laptop computer B, the laptop computer C) of the third portion 430 is checked, the second attribute information of the checked second product may be fixed. When the checkbox is unchecked, the second attribute information of the unchecked second product may be provided without being fixed. Here, an input of checking the checkbox or unchecking the checkbox may correspond to the number of times that selection inputs are applied to a selection checkbox portion.

FIG. 11A shows an example of providing information without fixing any of the plurality of second products in the third portion 430. Referring to FIG. 11A, when the first input 610 of the first direction is acquired at the third portion 430, the first attribute information 421 of the first product may be fixed and displayed in the second portion 420. In this case, the second attribute information 431 of the second product may be displayed while moving in the first direction by the first input 610 of the first direction corresponding to the third portion 430.

FIG. 11B shows an example of providing information by the first input 610 of the first direction corresponding to the third portion 430 with fixing second attribute information of some products among the plurality of second products in the third portion 430. Referring to FIG. 11B, the first input 610 of the first direction corresponding to the third portion 430 may be acquired while the second attribute information of the laptop computer B among the plurality of second products is fixed. In this case, the first attribute information 421 of the first product may be fixed and displayed in the second portion 420. Also, the second attribute information of the second products other than the fixed laptop computer B may be displayed and provided while moving in the first direction by the first input 610 of the first direction corresponding to the third portion 430. Referring to FIGS. 11A and 11B, the second attribute information 431 of the second product may be displayed while moving leftward by the first input 610 of the first direction. In FIG. 11A, any of the plurality of second products may not be fixed so that all the second attribute information 431 of the second product is displayed while moving leftward. In FIG. 11B, the second attribute information of the laptop computer B corresponding to at least one of the plurality of second products may be fixed so that second attribute information of second products other than the laptop computer B is displayed while moving leftward.

Referring to FIGS. 11C and 11D, the second input 620 of the second direction may include at least one of a scroll input applied through a touchscreen, an input of moving a scroll bar upward or downward, and an input for moving information displayed on any display upward or downward.

The information may be provided by fixedly displaying information (e.g., the laptop computer A, the laptop computer B, the laptop computer C) associated with names of the first product and the second product and movably displaying the first attribute information 421 of the first product and the second attribute information 431 of the second product. For example, the laptop computer A, the laptop computer B, and the laptop computer C corresponding to the information associated with names of the first product and the second product may be fixedly displayed in portions of the second portion 420 and the third portion 430, respectively. Also, the first attribute information 421 of the first product and the second attribute information 431 of the second product may be displayed while moving in the second direction by the second input 620 of the second direction corresponding to the second portion 420 or the third portion 430.

Referring to FIG. 11C, the second portion 420 or the third portion 430 may include a portion allowed to receive an input for providing information with fixing at least one attribute list selected from the first attribute information 421 of the first product or the second attribute information 431 of the second product. A portion in which an individual attribute selected from an attribute list is fixed may include a collective information portion for the individual attribute in the second portion 420 of FIG. 11C. For example, all pieces of product name information corresponding to the individual attribute among the attribute list may be fixed. As an example, when checkboxes at the head of a list of individual attributes (e.g., product name information, price information, rating information, manufacturer information, release timing information, display size information, CPU performance information, etc.) of the second portion 420 is checked, the first attribute information and the second attribute information corresponding to the checked attributes may be fixed. When the checkboxes are unchecked, information may be provided while the first attribute information and the second attribute information corresponding to the unchecked attributes are not fixed. Here, an input of checking or unchecking the box may correspond to the number of times that selection inputs are applied to a selection checkbox portion.

FIG. 11C shows an example of providing information without fixing any attribute of an attribute list. Referring to FIG. 11C, when the second input 620 of the second direction is acquired at the second portion 420 or the third portion 430, the first attribute information and the second attribute information corresponding to all attributes of an attribute list may be displayed while moving in the second direction. In this case, image information of the first product and image information of the second product which are not included in the first attribute information or the second attribute information may be fixed and displayed.

FIG. 11D shows an example of providing information in response to the second input 620 of the second direction corresponding to the second portion 420 or the third portion 430 with fixing attribute information regarding some attributes of the attribute list. Referring to FIG. 11D, the second input 620 of the second direction corresponding to the second portion 420 or the third portion 430 may be acquired while the first attribute information and the second attribute information corresponding to product name information and price information among the attribute list are fixed. In this case, the product name information and the price information among the first attribute information 421 of the first product and the second attribute information 431 of the second product may be fixed and displayed in portions of the second portion 420 and the third portion 430. Also, attribute information other than the fixed attribute list may be displayed while moving in the second direction by the second input 620 of the second direction. Referring to FIGS. 11C and 11D, attribute information may be provided and displayed while moving upward by the second input 620 of the second direction. In FIG. 11C, any of the attribute list may not be fixed so that all the first attribute information 421 of the first product and the second attribute information 431 of the second product may be provided while moving upward. In FIG. 11D, attribute information corresponding to the product name information and the price information may be fixed so that attribute information other than the fixed attribute list is provided while moving upward.

Figure 12:
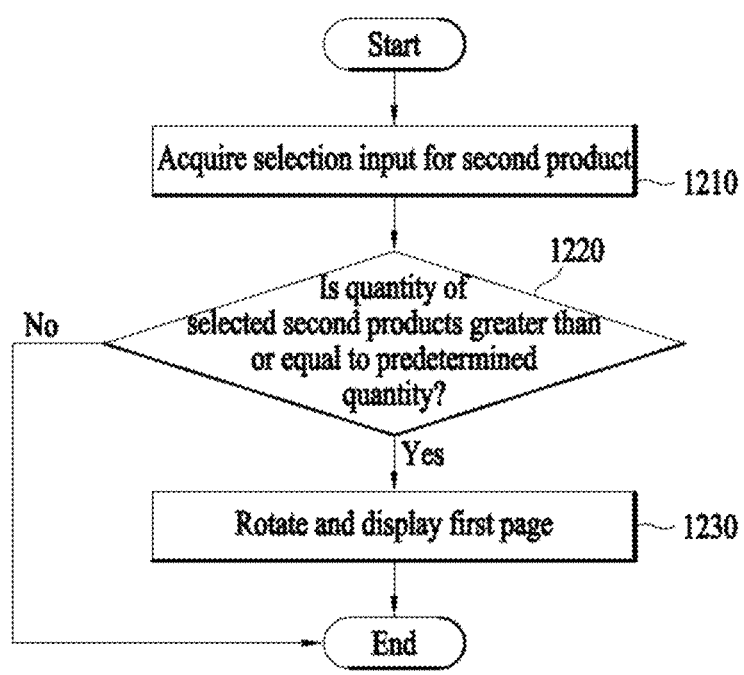
FIG. 12 is a flowchart related to an area of information provided on a display according to various example embodiments of the present disclosure.

FIG. 12 is a flowchart related to an area of information provided on a display according to example embodiments of the present disclosure.

FIG. 12 relates to a flow of displaying a first page by rotating on the display when at least a predetermined number of second products are selected based on a selection input for the second product.

In operation 1210, a selection input for a second product may be acquired. For example, an input of selecting an individual product from a plurality of second products may be acquired in response to the selection input of FIGS. 11A and 11B. Selection inputs for a laptop computer B, a laptop computer C, and a laptop computer D among the plurality of second products may be acquired.

In operation 1220, whether a quantity of selected second products is greater than or equal to a predetermined quantity may be verified. As an example, when the quantity of selected second products is greater than or equal to the predetermined quantity, operation 1230 may be performed. As another example, when the quantity of selected second products is less than the predetermined quantity, the first page may be provided without changing. A quantity corresponding to a criterion for determining whether to perform operation 1220 or 1230 may include an amount of information associated with the selected second products and fully provided on the display on which the first page is provided.

In operation 1230, the first page may be rotated and provided on the display. FIG. 11A shows an example of a screen of the display on which the first page is provided. Referring to FIG. 11A, information associated with the laptop computer C among the plurality of second products may not be fully provided in the third portion 430. When an input of selecting the laptop computer B and the laptop computer C from the plurality of second products is acquired, the first page may be rotated on the display and provided. In accordance with the rotation of the first page, the information associated with the laptop computer C for which the selection input is acquired may be fully provided. In this case, the predetermined quantity may be 2. The first page may be rotated at 90 degrees(° on the display and provided. The first page rotated on the display in operation 1230 may display a greater amount of second attribute information compared to a page provided before the rotation.

According to example embodiments of the present disclosure, a method of providing information on regarding a product in an electronic device includes identifying detailed information on a first product in response to a request on a first page for the first product, identifying, when the first product is included in a specific category, at least one second product corresponding to the specific category, identifying at least one attribute list corresponding to the specific category, and providing the first page. The first page may include detailed information on the first product displayed in a first portion, first attribute information of the first product corresponding to the attribute list and displayed in a second portion, and second attribute information of the at least one second product corresponding to the attribute list and displayed in a third portion corresponding to the second portion.

According to example embodiments of the present disclosure, in the method, the at least one second product is selected based on information on products included in the specific category. The information on the products may include at least one of rating information, price information, review information, and preference information.

According to example embodiments of the present disclosure, the method further includes providing information on at least one another product corresponding to the specific category on a page related to a product selected in response to an input of selecting one product from the at least one second product in the third portion. The at least one another product corresponding to the specific category may include the first product.

According to example embodiments of the present disclosure, in the method, the first attribute information is fixed and provided in response to a first input corresponding to the third portion. At least one of the second attribute information is moved based on the first input. The first input may include an input scrolled in a first direction.

According to example embodiments of the present disclosure, in the method, information associated with names of the first product and the second product is fixed and provided in response to a second input corresponding to the second portion or the third portion. The first attribute information and at least one of the second attribute information are moved based on the second input. The second input may include an input scrolled in a second direction.

According to example embodiments of the present disclosure, the method further includes providing a second page on which a product list including the first product is displayed, in response to a request for the second page. The second page includes third attribute information of a third product corresponding to the attribute list and displayed in a fourth portion. The third product may include a product different from the second product.

According to example embodiments of the present disclosure, in the method, the third product may be selected based on price information of products included in the specific category.

According to example embodiments of the present disclosure, the method further includes requesting a third page in response to a selection input corresponding to a portion of the fourth portion and providing the third page. The third page may include first attribute information of a first product corresponding to the attribute list and displayed in a fifth portion and third attribute information of the third product corresponding to the attribute list and displayed in a sixth portion corresponding to the fifth portion.

According to example embodiments of the present disclosure, the method further includes acquiring an input of changing the second product and displaying at least one second product changed in accordance with the input of changing and second attribute information of the changed at least one second product. The detailed information on the first product and the first attribute information may be maintained.

According to example embodiments of the present disclosure, in the method, a portion selected from at least one of the second attribute information and the first attribute information are fixed and displayed in accordance with a selection input to the second product and a first input, so that a portion other than the portion selected from at least one of the second attribute information is moved based on the first input. A portion selected from at least one of the second attribute information and the first attribute information are fixed and displayed in accordance with the first attribute information, a selection input to at least one of the second attribute information, and a second input, so that a portion other than the portion selected from at least one of the second attribute information and the first attribute information is moved in a second direction based on the second input. The first input may include an input scrolled in a first direction. The second input may include an input scrolled in the second direction.

According to example embodiments of the present disclosure, the method further includes providing the first page by rotating the first page based on a selection input to the at least one second product. The rotated first page may display a greater amount of second attribute information compared to a page provided before rotation.

According to example embodiments of the present disclosure, in the method, the providing of the first page may include providing the first page by rotating the first page when a quantity of products selected in response to a selection input to the second product is greater than or equal to a predetermined quantity.

According to example embodiments of the present disclosure, an electronic device for providing information on or regarding a plurality of products include a processor. The processor identifies detailed information on a first product in response to a request on a first page for the first product, identifies, when the first product is included in a specific category, at least one second product corresponding to the specific category, identifies at least one attribute list corresponding to the specific category; and provides the first page. The first page may include detailed information on the first product displayed in a first portion, first attribute information of the first product corresponding to the attribute list and displayed in a second portion, and second attribute information of the at least one second product corresponding to the attribute list and displayed in a third portion corresponding to the second portion.

According to example embodiments of the present disclosure, a non-transitory computer-readable recording medium includes a medium configured to store computer-readable instructions. The computer-readable instructions are executed by a processor to perform a method of providing information, the method including identifying detailed information on a first product in response to a request on a first page for the first product, identifying, when the first product is included in a specific category, at least one second product corresponding to the specific category, identifying at least one attribute list corresponding to the specific category, and providing the first page. The first page includes detailed information on the first product displayed in a first portion, first attribute information of the first product corresponding to the attribute list and displayed in a second portion, and second attribute information of the at least one second product corresponding to the attribute list and displayed in a third portion corresponding to the second portion.

Meanwhile, the example embodiments of the present disclosure have been disclosed in the present specification and drawings, and although specific terms are used, they are merely used in a general sense to easily describe the technical content of the present disclosure and to aid understanding of the present disclosure, and are not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic device or terminal according to the above-described example embodiments may include a processor, a memory that stores and executes program data, a permanent storage such as a disk drive, a communication port that communicates with an external device, a touch panel, a key, a UI device such as a button, and the like. Methods implemented as software modules or algorithms may be stored on a computer-readable recording medium as computer-readable codes or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable codes may be stored and executed in a distributed scheme. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, the example embodiment may employ integrated circuit configurations, such as a memory, processing, logic, and a look-up table, capable of executing various functions by control of one or more microprocessors or other control devices. Similar to executing the components in software programming or software elements, the present example embodiment can be implemented in programming or scripting languages such as python, C, C++, Java, and assembler, including various algorithms implemented by a combination of data structures, processes, routines or other programming configurations. Functional aspects may be implemented in algorithms executed on one or more processors. In addition, the present example embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely exemplary, and other example embodiments may be implemented within the scope of the following claims.

What is claimed is:

1. A method of providing information regarding a product in an electronic device, the method comprising:
   identifying, by a processor of the electronic device, detailed information regarding a first product in response to a request on a first page for the first product;
   identifying, by the processor, in response to determining that the first product is included in a specific category, at least one second product corresponding to the specific category;
   identifying, by the processor, at least one attribute list comprising a plurality of product attributes each corresponding to the specific category;
   acquiring, from a device of a user, at least one selection input to the at least one second product; and
   providing the first page,
   wherein the first page comprises detailed information regarding the first product displayed in a first portion,
   first attribute information of the first product corresponding to the attribute list and displayed in a first column in a second portion, and
   second attribute information of the at least one second product corresponding to the attribute list and displayed in a second column in a third portion corresponding to the second portion, wherein each attribute of the second attribute information in the second column is aligned with each attribute of the first attribute information in the first column,
   wherein a portion selected from at least one of the second attribute information and the first attribute information are fixed and displayed in accordance with a selection input to the at least one second product and a first input, so that a portion other than the portion selected from at least one of the second attribute information is moved based on the first input,
   wherein the first input comprises an input scrolled in a first direction,
   wherein all pieces of the second attribution information aligned corresponding to respective product indicated by the selection input are fixed in the portion selected from at least one of the second attribute information,
   wherein all pieces of the second attribution information aligned corresponding to a product other than the respective product in the at least one second product are scrolled based on the first input,
   wherein the at least one second product is selected based on information regarding products included in the specific category;
   wherein the information regarding the products comprises rating information;
   wherein the at least one second product is selected based on the rating information being greater than or equal to a predetermined rating, and
   wherein whether the first page is provided by being rotated from a first direction of a display of a user device to a second direction of the display of the user device is determined based on whether the number of the at least one second product is equal to or greater than a predetermined number and whether the second attribute information of the at least one second product is not completely displayed in the first direction of the display of the user device.

2. The method of claim 1, wherein: the information regarding the products further comprises at least one two or more of rating information, price information, review information, or preference information.

3. The method of claim 1, further comprising:
   providing information regarding at least one another product corresponding to the specific category on a page related to a product selected in response to an input of selecting one product from the at least one second product in the third portion,
   wherein the at least one another product corresponding to the specific category comprises the first product.

4. The method of claim 1, wherein:
   the first attribute information is fixed and provided in response to the first input corresponding to the third portion;
   at least one of the second attribute information is moved based on the first input.

5. The method of claim 1, wherein:
information associated with names of the first product and the second product is fixed and provided in response to a second input corresponding to the second portion or the third portion;
the first attribute information and at least one of the second attribute information are moved based on the second input; and
the second input comprises an input scrolled in a second direction.

6. The method of claim 1, further comprising:
providing a second page on which a product list including the first product is displayed,
in response to a request for the second page, wherein the second page comprises third attribute information of a third product corresponding to the attribute list and displayed in a fourth portion; and
wherein the third product comprises a product different from the second product.

7. The method of claim 6, wherein the third product is selected based on price information of products included in the specific category.

8. The method of claim 6, further comprising:
requesting a third page in response to a selection input corresponding to a portion of the fourth portion; and
providing the third page,
wherein the third page comprises the first attribute information of the first product corresponding to the attribute list and displayed in a fifth portion, and
wherein the third attribute information of the third product corresponding to the attribute list and displayed in a sixth portion corresponding to the fifth portion.

9. The method of claim 1, further comprising:
acquiring an input of changing the second product; and
displaying at least one second product changed in accordance with the input of changing and second attribute information of the changed at least one second product, wherein the detailed information regarding the first product and the first attribute information are maintained.

10. The method of claim 1, wherein:
a portion selected from at least one of the second attribute information or the first attribute information are fixed and displayed in accordance with the first attribute information, a selection input to at least one of the second attribute information, and a second input, so that a portion other than the portion selected from at least one of the second attribute information and the first attribute information is moved in a second direction based on the second input; and the second input comprises an input scrolled in the second direction.

11. An electronic device for providing information regarding a plurality of products, the electronic device comprising:
a processor,
wherein the processor is configured to:
identify detailed information regarding a first product in response to a request on a first page for the first product;
identify, in response to determining that the first product is included in a specific category, at least one second product corresponding to the specific category;
identify at least one attribute list comprising a plurality of product attributes each corresponding to the specific category;
acquire, from a device of a user, at least one of selection input to the at least one second product; and
provide, to the device of the user, the first page, and the first page comprises detailed information regarding the first product displayed in a first portion, first attribute information of the first product corresponding to the attribute list and displayed in a first column in a second portion, and second attribute information of the at least one second product corresponding to the attribute list and displayed in a second column in a third portion corresponding to the second portion, wherein each attribute of the second attribute information in the second column is aligned with each attribute of the first attribute information in the first column,
wherein a portion selected from at least one of the second attribute information and the first attribute information are fixed and displayed in accordance with a selection input to the at least one second product and a first input, so that a portion other than the portion selected from at least one of the second attribute information is moved based on the first input,
wherein the first input comprises an input scrolled in a first direction,
wherein all pieces of the second attribution information aligned corresponding to respective product indicated by the selection input are fixed in the portion selected from at least one of the second attribute information,
wherein all pieces of the second attribution information aligned corresponding to a product other than the respective product in the at least one second product are scrolled based on the first input,
wherein the at least one second product is selected based on information regarding products included in the specific category;
wherein the information regarding the products comprises rating information;
wherein the at least one second product is selected based on the rating information being greater than or equal to a predetermined rating, and
wherein whether the first page is provided by being rotated from a first direction of a display of a user device to a second direction of the display of the user device is determined based on whether the number of the at least one second product is equal to or greater than a predetermined number and whether the second attribute information of the at least one second product is not completely displayed in the first direction of the display of the user device.

12. A non-transitory computer-readable recording medium comprising:
a medium configured to store computer-readable instructions, wherein the computer-readable instructions are executed by a processor to perform a method of providing information, the method comprising:
identifying detailed information regarding a first product in response to a request on a first page for the first product;
identifying, in response to determining that the first product is included in a specific category, at least one second product corresponding to the specific category;
identifying at least one attribute list comprising a plurality of product attributes each corresponding to the specific category;
acquiring, from a device of a user, at least one of selection input to the at least one second product; and
providing, to the device of the user, the first page, and the first page comprises detailed information regarding the first product displayed in a first portion, first attribute information of the first product corresponding to the attribute list and displayed in a first column in a second portion, and second attribute information of the at least one second product corresponding to the attribute list and displayed in a second column in a third portion corresponding to the second portion, wherein each attribute of the second attribute information in the second column is aligned with each attribute of the first attribute information in the first column, wherein a portion selected from at least one of the second attribute information and the first attribute information are fixed and displayed in accordance with a selection input to the at least one second product and a first input, so that a portion other than the portion selected from at least one of the second attribute information is moved based on the first input, wherein the first input comprises an input scrolled in a first direction, wherein all pieces of the second attribution information aligned corresponding to respective product indicated by the selection input are fixed in the portion selected from at least one of the second attribute information, wherein all pieces of the second attribution information aligned corresponding to a product other than the respective product in the at least one second product are scrolled based on the first input, wherein the at least one second product is selected based on information regarding products included in the specific category;

wherein the information regarding the products comprises rating information; and wherein the at least one second product is selected based on the rating information being greater than or equal to a predetermined rating, and wherein whether the first page is provided by being rotated from a first direction of a display of a user device to a second direction of the display of the user device is determined based on whether the number of the at least one second product is equal to or greater than a predetermined number and whether the second attribute information of the at least one second product is not completely displayed in the first direction of the display of the user device.

\* \* \* \* \*